April 24, 1956 L. J. NEGAARD 2,742,771
SPOON HOLDER FOR POTS AND PANS
Filed July 22, 1952

Lloyd J. Negaard
INVENTOR.

BY *Clarence A. O'Brien*
and *Harvey B. Jacobson*
Attorneys

United States Patent Office 2,742,771
Patented Apr. 24, 1956

2,742,771

SPOON HOLDER FOR POTS AND PANS

Lloyd J. Negaard, Minneapolis, Minn.

Application July 22, 1952, Serial No. 300,202

1 Claim. (Cl. 65—65)

The present invention relates to kitchen utensils generally speaking and has more particular reference to a new and improved spoon holder which is fashioned from wire and is adapted to be attached to the vertical wall of a pot, sauce pan or the like, and which, when in position, serves to temporarily harness a spoon in an elevated ready-to-use position.

As the preceding paragraph implies, so-called spoon holders are not, generally speaking, new. In fact, one familiar with this category of inventions is aware that there are many and varied styles and forms of attachments for pans and the like which are expressly designed to support a spoon in an elevated readily accessible position. It follows, therefore, that the present invention has to do with a wire-type spoon holder attachment which is possessed of certain structural refinements and improvements which go to make up a holder which is structurally unique, is simple, economical and practical.

Another object of the invention is to provide a spoon holder attachment which is readily applicable and removable and which is less costly to manufacture, to in this manner appeal to manufacturers and users alike.

Briefly, the improved spoon holder is characterized by a pair of companion U-shaped adapters capable of being saddled over the rim of said wall, and a longitudinally bowed keeper interconnecting corresponding interiorly disposable limbs of said adapters.

Then, too, novelty is predicated on an arrangement wherein the exteriorly disposed limbs of the adapters are provided with resilient detents which are engageable with the exterior of the wall of the pan and which detents form portions of terminal extensions of the over-all wire unit, said extensions being provided at their extremities with conveniently accessible and usable finger-grips.

Other objects, features and advantages will become more readily apparent from the following description and the accompanying sheet of drawings.

In the accompanying drawings wherein like numerals are employed to designate like parts throughout the view.

Figure 1:
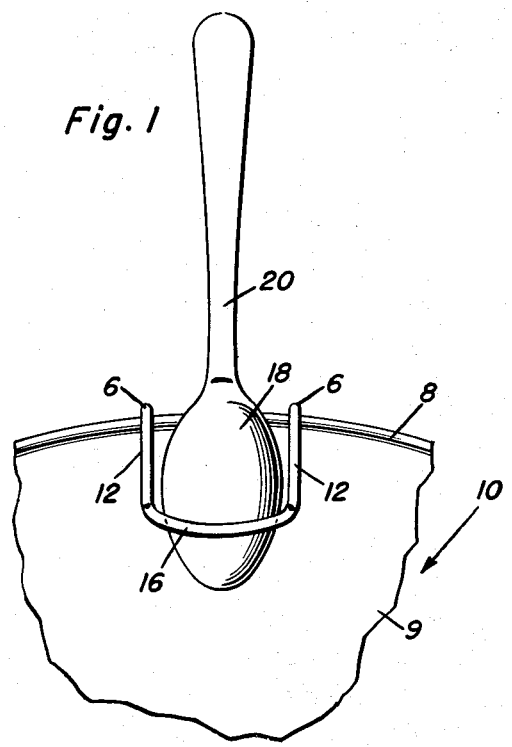
Figure 1 is an elevational view of a spoon holder attachment constructed in accordance with the principles of the present invention showing the manner in which the same is applied and used.
Figure 2:
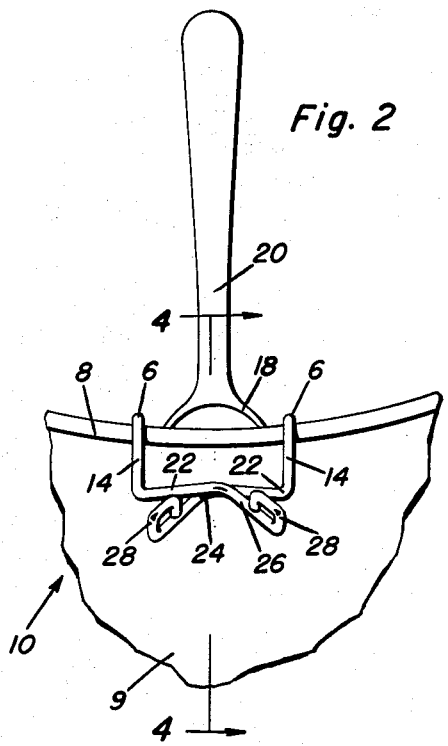
Figure 2 is a view of the same observing the details of construction from the exterior surface of the wall of the pan.
Figure 3:
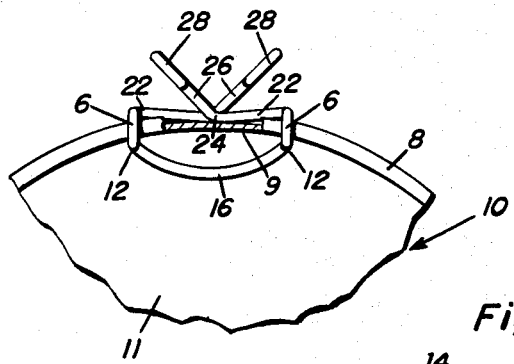
Figure 3 is a top plan view with the spoon removed and with a portion of the wall of the pan broken away and shown in section.
Figure 4:
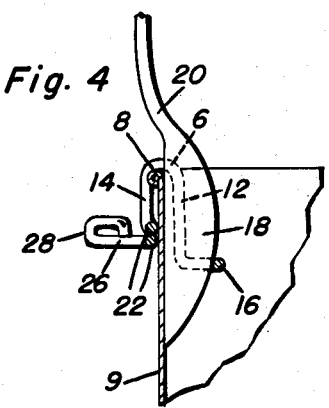
Figure 4 is a view which may be said to be taken on the approximate vertical lines 4—4 of Figure 2 looking in the direction of the arrows.
Figure 5:
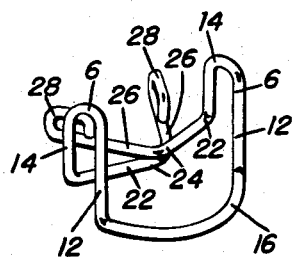
Figure 5 is a perspective view of the attachment removed from the pan.

As before stated the invention is in the form of an attachment and is constructed from a single length of suitable gauge wire having desired rigid and resilient properties. After the wire is bent to the form shown in the drawings the end product comprises readily attachable and removable clips and these may be conveniently referred to as inverted U-shaped adapters. These adapters are substantially identical in construction and a description of one will suffice for both. To this end, each adapter comprises a bight portion 6 which is saddled over the bead 8 forming the rim of the wall 9 of the pan 10. The bottom of the pan is denoted by the numeral 11. Each adapter also includes an interior vertical limb 12 and a similar spaced parallel but shorter exterior vertical limb 14. The respective limbs 12—12 are interconnected by the bight portion of the wire which is actually a curvilineal bow member 16 and which when in position against the interior of the wall of the pan provides an arcuate bridling keeper for the bowl portion 18 of the spoon 20, this being an ordinary spoon. The free end portions of the wire are exteriorly disposed and, more specifically, the limbs 14—14, which are resilient, having extensions 22—22 which are directed toward each other, slidingly overlapped and are formed into two angular bends 24. These bends provide friction detents and bear firmly into retaining contact with the convexly curved exterior surface of the wall of the pan. The free or terminal end portions 26—26 are disposed in divergent relationship and their extremities are provided with return bends defining suitable finger-grips 28—28.

It is obvious that by saddling or clipping the inverted U-shaped adapters over the bead and adjacent wall portion of the pan, the attachment is ready for use. Of course, the attachment is applied so that the curved keeper 16 is in a plane at approximate right angles to the wall of the pan. It thus cooperates with the wall and the bowl of the spoon in harnessing the spoon temporarily in an elevated position on the pan with the handle extending well above the wall of the pan where it is readily accessible. This means that the spoon is lifted up out of the contents in the pan when cooking the latter, and the spoon is kept from slipping down in the pan and also is kept from becoming overheated. It is also in constant readiness for detachment from the holder so that it can be conveniently used for stirring and other purposes. Spoon holders, even those of wire, are not new but one having the saddling adapters or clips with the keeper 16 and with the detents 24—24 engaging resiliently the exterior the wall of the pan is new. It is also thought to be new to provide these detents with diverging terminal portions and finger grips, so that by squeezing the finger grips together the detents 24—24 are released from pressure contact with the pan whereupon the entire attachment is capable of ready application and removal.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A spoon holder designed as an attachment for the wall of a sauce pan and comprising a one-piece wire structure embodying a pair of duplicate spaced inverted U-shaped adapters which, when placed and thus saddled over the upper edge of the sauce pan wall, assume vertical parallel positions, each adapter embodying a bight portion and inward and outward depending linearly straight depending coplanar limbs, said inward limbs being resilient and of a length greater than the length of said outward limbs, a horizontal curvilineal member having its respective ends joined to the respective lower ends of said inward limbs and joining said inward limbs to each other, the curvature of said member providing a convex bend intermediate the ends of said member, said convex bend being of prescribed curvature arcuity and being in a plane at right angles to the vertical axes of said inward limbs and cooperating with the latter and serving to assume a position spaced from inward surface of said wall and thus providing a bridling keeper for the bowl of a spoon, a pair of horizontally disposed extensions each shorter than and spaced outwardly from said curvilineal member and joined at their respective outer ends to the respective lower ends of said outward limbs and directed laterally from said outward limbs toward each other in parallel planes and having their other ends adjacent and slidingly overlapping one another, and a pair of free terminal wire portions disposed and extending laterally and outwardly from said overlapping ends in parallel planes and divergent relationshop and joined at their converging ends to the respective cooperating overlapping ends by way of junctional bends and providing a pair of horizontal opposed expansible and contractible finger grips, the latter being at approximate right angles to said outward limbs and adapted to be handily gripped and manually squeezed together to cause said outward limbs to flex and toe in toward each other in a manner to assist in applying and removing said U-shaped adapters.

References Cited in the file of this patent

UNITED STATES PATENTS

| | | |
|---|---|---|
| 463,681 | Hornberger, et al. | Nov. 24, 1891 |
| 1,048,280 | Bennett | Dec. 24, 1912 |
| 1,286,014 | Jetmund | Nov. 26, 1918 |
| 1,545,468 | Domenico | July 7, 1925 |
| 1,752,522 | Eckelman | Apr. 1, 1930 |
| 1,776,655 | Estes | Sept. 23, 1930 |
| 2,460,542 | Smith | Feb. 1, 1949 |

FOREIGN PATENTS

| | | |
|---|---|---|
| 347,818 | Great Britain | May 7, 1931 |